US009547868B2

(12) United States Patent
Sankaranarayanan et al.

(10) Patent No.: US 9,547,868 B2
(45) Date of Patent: *Jan. 17, 2017

(54) TARGETED ADVERTISING AND CUSTOMIZED DISPLAY OF ADVERTISEMENTS IN SATELLITE BROADCASTING

(71) Applicant: International Business Machines Corporation, Armonk, NY (US)

(72) Inventors: Karthik Sankaranarayanan, Bangalore (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,814

(22) Filed: Jan. 26, 2015

(65) Prior Publication Data

US 2015/0326946 A1 Nov. 12, 2015

Related U.S. Application Data

(63) Continuation of application No. 14/271,488, filed on May 7, 2014.

(51) Int. Cl.
*G06Q 30/02* (2012.01)
*H04N 21/81* (2011.01)
(Continued)

(52) U.S. Cl.
CPC ...... *G06Q 30/0254* (2013.01); *G06Q 30/0269* (2013.01); *H04N 21/25435* (2013.01);
(Continued)

(58) Field of Classification Search
CPC ................................. H04N 21/4122
See application file for complete search history.

(56) References Cited

U.S. PATENT DOCUMENTS 6,310,661 B1 * 10/2001 Arsenault ............... H04N 5/50
348/569
7,328,448 B2 2/2008 Eldering et al.
(Continued)

FOREIGN PATENT DOCUMENTS

CA 2387562 C 6/2001
EP 1197082 B1 7/2011
(Continued)

OTHER PUBLICATIONS

IBM: List of IBM Patents or Patent Applications Treated as Related (Appendix P).
(Continued)

*Primary Examiner* — Justin Shepard
(74) *Attorney, Agent, or Firm* — Erik K. Johnson

(57) ABSTRACT

Selecting a content filler from a plurality of content fillers in a satellite broadcast comprises receiving a content in a first broadcast frequency channel, and a plurality of content fillers in a respective plurality of second broadcast frequency channels, wherein the content includes a gap in content to be filled by one of the plurality of content fillers, the gap in content defined by a start indicator and an end indicator. The receiver transmits the content to a display device. The receiver determines a second broadcast frequency channel, from among the plurality of second broadcast frequency channels and responsive to receiving the start indicator, switches to the determined second broadcast frequency channel, transmits the content filler in the determined second broadcast frequency channel to the display device. Responsive to receiving the end indicator, the receiver switches to the first broadcast frequency channel and transmits the content to the display device.

10 Claims, 6 Drawing Sheets

(51) Int. Cl.
*H04N 21/2543* (2011.01)
*H04N 21/466* (2011.01)
*H04N 21/658* (2011.01)
*H04N 21/61* (2011.01)
*H04N 21/41* (2011.01)
*H04N 21/44* (2011.01)
*H04N 21/258* (2011.01)
*H04N 21/431* (2011.01)
*H04N 21/458* (2011.01)
*H04N 21/462* (2011.01)
*H04N 21/845* (2011.01)

(52) U.S. Cl.
CPC ....... *H04N 21/25883* (2013.01); *H04N 21/41* (2013.01); *H04N 21/4104* (2013.01); *H04N 21/4108* (2013.01); *H04N 21/4122* (2013.01); *H04N 21/4126* (2013.01); *H04N 21/4312* (2013.01); *H04N 21/44* (2013.01); *H04N 21/44016* (2013.01); *H04N 21/458* (2013.01); *H04N 21/4622* (2013.01); *H04N 21/4667* (2013.01); *H04N 21/6143* (2013.01); *H04N 21/6193* (2013.01); *H04N 21/6582* (2013.01); *H04N 21/812* (2013.01); *H04N 21/8455* (2013.01)

(56) References Cited

U.S. PATENT DOCUMENTS

| | | | |
|---|---|---|---|
| 7,844,985 B2 | 11/2010 | Hendricks et al. | |
| 2002/0104083 A1* | 8/2002 | Hendricks | H04H 20/10 725/34 |
| 2005/0039206 A1* | 2/2005 | Opdycke | G06Q 30/02 725/35 |
| 2007/0157230 A1 | 7/2007 | Mardirossian | |
| 2008/0126204 A1* | 5/2008 | Evans | G06F 17/243 705/14.69 |
| 2008/0235725 A1 | 9/2008 | Hendricks | |
| 2009/0119702 A1* | 5/2009 | Jagannathan | H04N 21/23424 725/32 |
| 2011/0082750 A1 | 4/2011 | Beatty et al. | |

FOREIGN PATENT DOCUMENTS

| | | | |
|---|---|---|---|
| WO | 2010075432 A1 | 7/2010 | |
| WO | 2011089575 A1 | 7/2011 | |

OTHER PUBLICATIONS

Sankaranarayanan et al., "Targeted Advertising and Customized Display of Advertisements in Satellite Broadcasting", U.S. Appl. No. 14/271,488, filed May 7, 2014, 33 pages.

Acharya, "Hitting the Target with Television Advertising," Enriching Communications, 2008, p. 1-2, vol. 2, Issue 2, Alcatel-Lucent.

Agrawal, "Method and System for Showing Targeted Advertisements in a Smart Television during Broadcasting of a Regular Television Channel," IP.com, Apr. 18, 2012, p. 1-2, IP.com No. IPCOM000216764D, Yahoo! Defensive Publication Docket No. ID11-8134.

Reid, "Are targeted ads the future?," Campaign, Dec. 8, 2011, p. 1-4, Haymarket Business Media, http://www.campaignlive.co.uk/news/11082261, Accessed on Apr. 14, 2014.

TVB, "Nielsen Cross-Platform Report—Q4 2013," p. 1-2, Television Bureau of Advertising, Inc., http://www.tvb.org/trends/273069, Accessed on Apr. 29, 2014.

TVB, "Q4 2013 and Full Year Spending Summary," p. 1-5, Television Bureau of Advertising, Inc., http://www.tvb.org/trends/4705, Accessed on Apr. 29, 2014.

* cited by examiner

TARGETED ADVERTISING AND CUSTOMIZED DISPLAY OF ADVERTISEMENTS IN SATELLITE BROADCASTING

CROSS REFERENCE

The present application is a continuation of and claims priority under 35 U.S.C §120 of U.S. patent application Ser. No. 14/271,488, filed on May 7, 2014, which is incorporated herein by reference in its entirety.

BACKGROUND

The present disclosure relates generally to media and entertainment, and more particularly, to targeted advertising and customized display of advertisements in satellite broadcasting.

The cost of producing and distributing television program content has traditionally been covered by selling advertising space at designated points in the distributed program. Over the years, advertisers have looked for ways to more closely target their advertising to the viewers anticipated to be watching at the time the advertisements are shown. For example, advertisers might purchase advertising space during a particular program often viewed by large numbers of their target audience, such as snack food advertisements during sporting events. In addition, television advertisers look for alternate ways to advertise beyond the designated advertising points in program content, such as placing products in the actual program content. Today, advertisers are examining new ways of reaching their target audiences as broadcasters attempt to deliver more relevant and interactive advertisements to their subscribers.

SUMMARY

Embodiments of the present disclosure disclose a method and system for selecting a content filler from a plurality of content fillers in a satellite broadcast. The method comprises the receiver receiving a content in a first broadcast frequency channel, and a plurality of content fillers in a respective plurality of second broadcast frequency channels, wherein the content includes a gap in content to be filled by one of the plurality of content fillers, the gap in content defined by a start indicator and an end indicator. The receiver transmits the content to a display device. The receiver determines a second broadcast frequency channel, from among the plurality of second broadcast frequency channels and responsive to the receiver receiving the start indicator, the receiver switches to the determined second broadcast frequency channel, transmits the content filler in the determined second broadcast frequency channel to the display device. Responsive to the receiver receiving the end indicator, the receiver switches to the first broadcast frequency channel and transmits the content to the display device.

In another aspect, the content received, by the receiver, includes the content and a plurality of display fillers in the first broadcast frequency channel, wherein the content and the plurality of display fillers are received concurrently in the first broadcast frequency channel. Based on characteristics of the display device, selecting, by the receiver, a display layout from a plurality of display layouts, wherein the display layout defines a location on the display device's viewing area to display content and one or more display fillers. Selecting, by the receiver, one or more of the plurality of display fillers and transmitting, by the receiver, the content and the one or more selected display fillers, in the selected display layout, to the display device.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
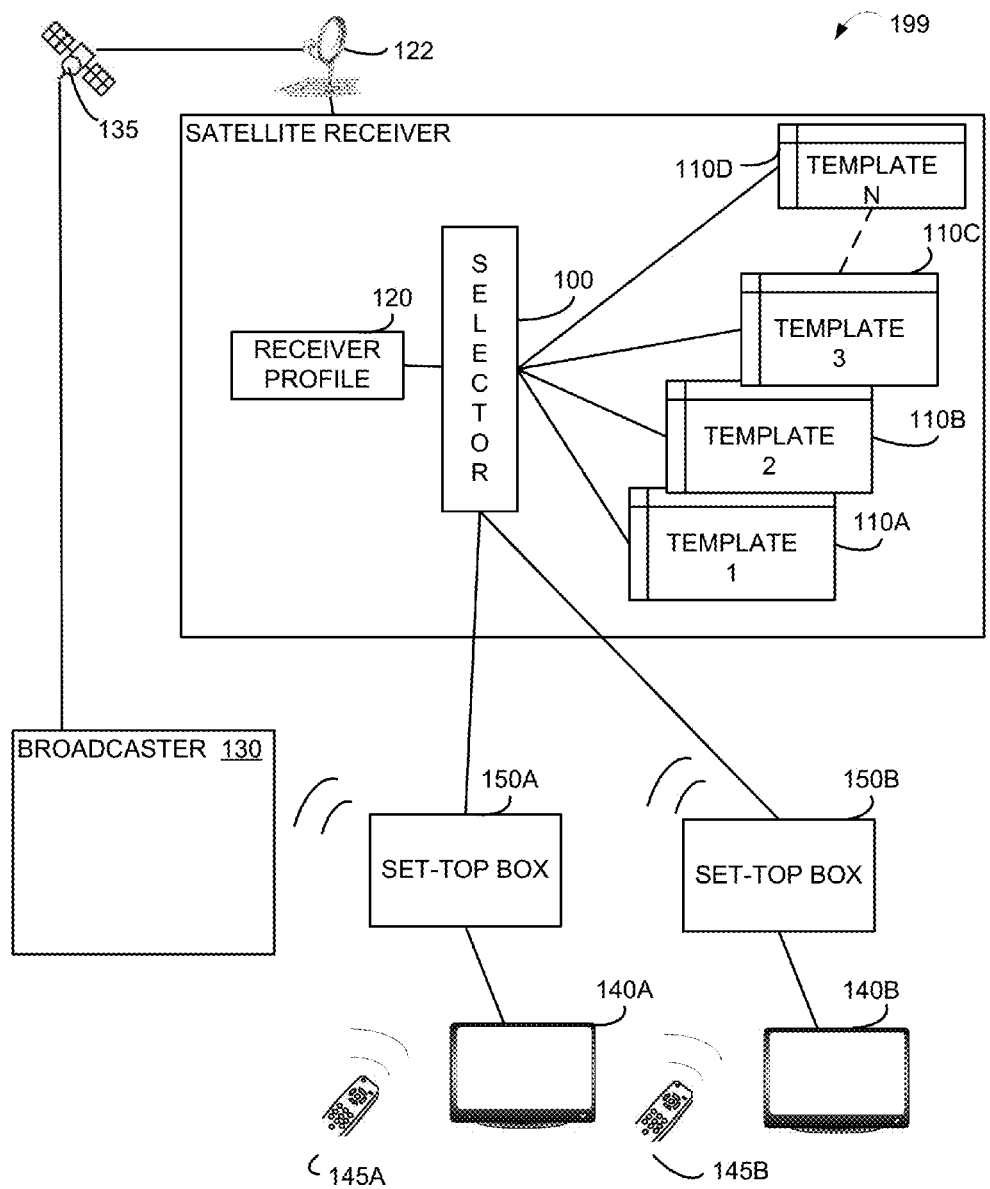
FIG. 1 illustrates a functional block diagram of a satellite broadcast system, in accordance with an embodiment of the disclosure.

Satellite broadcast television is one of the largest mediums of advertising. Even with the advent of the Internet and mobile television, satellite broadcast television continues to supply program content to a large viewing audience. With this large audience, advertisers are constantly striving to make their advertisements reach the right audience to maximize their return on investment. Broadcast program content and advertisements may be sent to all satellite receivers in a broadcast area, and all viewers of the same program content may see the same advertisements. The size of the audience for specific television program content, as measured by companies such as Nielsen Media Research, is often used as a metric for television advertisement placement, and consequently, for the rates charged to advertisers to air their advertisements. The size of the audience may vary for each network, program content, and time of day. Currently, program providers may define the number and location of advertising insertion points, or gaps, in a program's content. Program providers may set indicators in the program content to define the start and end of the gaps in content.

To further optimize return on investment, advertisers may entreat satellite broadcasters to broadcast a plurality of advertisements, concurrently, each targeted to a different viewing audience demographic. Various embodiments of the present disclosure may enable individual satellite receivers to select, in real-time, content filler, or advertisements, from among the plurality of advertisements concurrently broadcast, to insert into the program content at the defined insertion point. This may allow broadcasters to decide which advertisements to broadcast at any point prior to actual broadcast, and may allow viewers to see advertisements selected, or targeted, for them, which may differ from advertisements seen by other viewing audiences of the same program content.

Typically targeted advertising matches advertising criteria with audience qualifiers. Audience qualifiers may include, but are not limited to, the demographics and viewing behavior of the audience. The demographic of the audience at any particular satellite receiver may be determined through, but not limited to, publicly available surveys, subscriber information gathered at the time of subscription purchase, purchase transactions made through a broadcast service, and location. Viewing behavior may be determined by, for example, set top boxes with Global System for Mobile (GSM) Communications chips or smart phone based remote control applications.

Inserting targeted advertisements only at predefined insertion points may not fully address the needs of advertisers, as viewers may utilize advertisement insertion points in the program content to perform other tasks that take them away from television viewing. Displaying advertisements on the television during program content may help ensure advertisements are seen, even when advertisement insertion points are skipped, fast-forwarded through, or walked away from.

Advertisements that display on the television during program content are becoming more common and are typically displayed as an overlay at the bottom or top of the television screen. These advertisement overlays may block out some of the program content viewing area. Advertisement overlays, displayed much like severe weather warnings, may overlay 5 to 10 percent of the television's program content viewing area. In the extreme, an advertisement overlay may overlay as much as 25 percent of the program content viewing area. Subtitles, which may be part of the program content, may be completely obscured by the overlays. Various embodiments of the present disclosure may customize the television viewing area to enable the concurrent display of display fillers, or advertisements, and program content without overlaying the program content viewing area with the advertisements. Various embodiments may customize the viewing area based on the television characteristics such as screen dimensions. The viewing area customization may include, but is not limited to, advertisement display locations, advertisement sizes, and number of advertisements that may be displayed concurrently. In certain embodiments, the advertisements displayed concurrently with program content may be targeted advertisements for the viewing audience of the particular satellite receiver.

Exemplary embodiments of the disclosure are described in a satellite broadcast system, broadcasting to a television, although those of skill in the art will appreciate that other embodiments of the invention may be used to advantage for numerous program content delivery systems with numerous receiving devices where advertising covers the cost of producing program content.

FIG. 1 illustrates a functional block diagram of an exemplary satellite broadcast system 199, in accordance with an embodiment of the disclosure. Satellite broadcast system 199 includes satellite broadcaster 130, satellite 135, satellite receiver 122, televisions 140A, 140B and their set-top boxes 150A, 150B, and remote control devices 145A, 145B that send signals to their respective televisions 140A, 140B and set-top boxes 150A, 150B.

Figure 6:
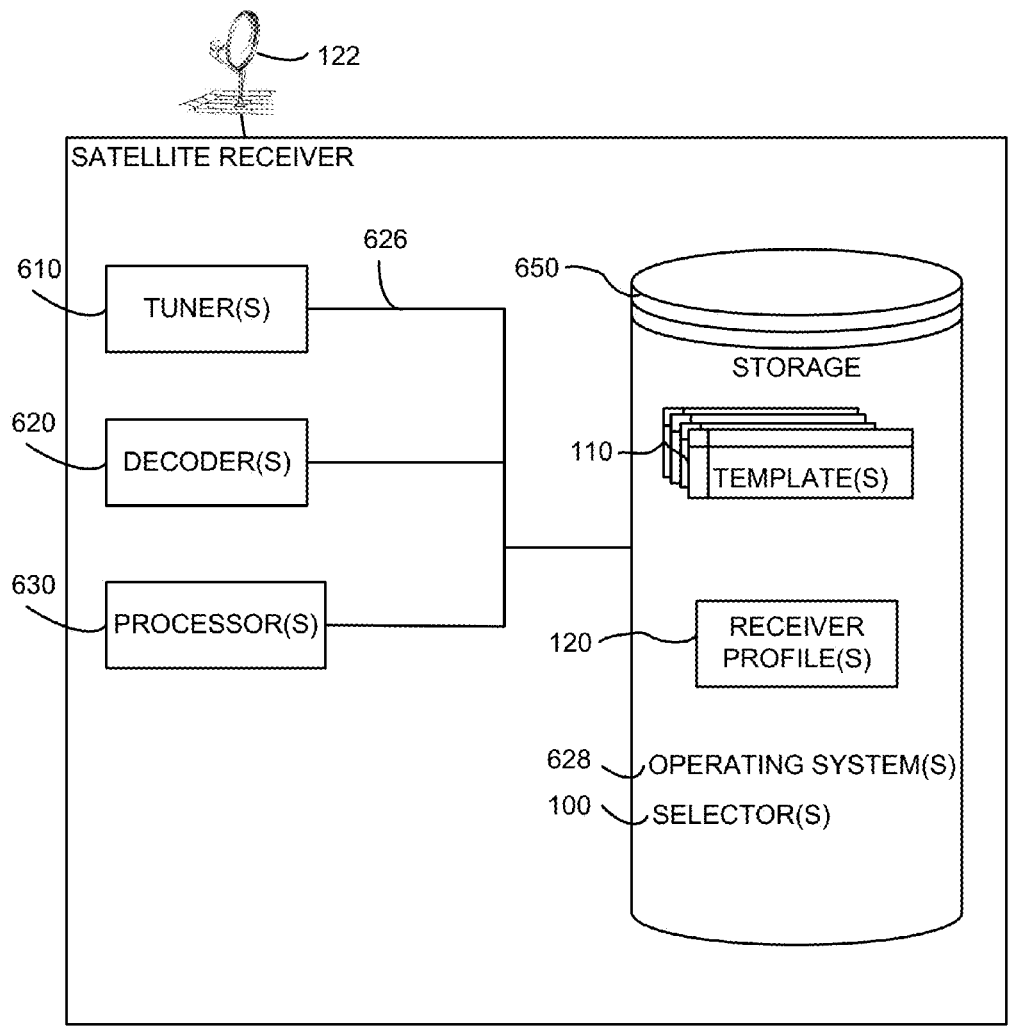
FIG. 6 depicts a block diagram of components of the satellite receiver in a satellite broadcast system, in accordance with an embodiment of the disclosure.

Satellite receiver 122 includes a selector 100, storage for a receiver profile 120, and storage for a plurality of templates 110A, 110B, 110C, 110D, all of which may be stored, for example, on a readable storage medium, such as satellite receiver readable storage medium (media) 650 (FIG. 6).

Satellite broadcaster 130 may collect demographic information for the viewing audience of a satellite receiver 122 in its satellite broadcast system 199. The demographic information may include publicly available survey information, information gathered with the subscription purchase, and viewing behavior collected through GSM chips in the set-top boxes 150 and remote control 145 applications. The broadcaster 130 may keep demographic information static for the life of a subscription, update demographic information when a subscription is renewed, or update demographic information regularly to reflect changing viewing habits or other demographics collected. The demographics of the viewing audience of satellite receiver 122 may be generalized to reflect all viewing audiences of satellite receiver 122 or may vary to reflect different viewing audiences at different times of the day or different days of the week. For example, a younger audience may be the viewing audience in the early afternoon, as determined by cartoon viewing selections in that time period.

Satellite broadcaster 130 may include a transmitter or other equipment operable to transmit a plurality of frequency channels having data representing audio content, visual content, display templates 110 or selection signals. The plurality of frequency channels may be received at a satellite 135, which in turn rebroadcasts the plurality of frequency channels to be received at one or more terrestrial satellite receivers 122. Satellite broadcaster 130 may establish a plurality of frequency channels that include advertisements. Each frequency channel may target advertisements to a particular viewing audience demographic. Satellite broadcaster 130 may pre-determine the frequency channel to be monitored by selector 100 or may signal selector 100, through satellite 135, which frequency channel to monitor when selecting advertisements targeted to display on television 140A, 140B during an advertisement insertion point. Selector 100 may receive the signal from satellite broadcaster 130, with the frequency channel to monitor, when the satellite receiver 122 is first established, during every program content broadcast, or any interval in-between. Selector 100 may store the frequency channel to monitor in the receiver profile 120.

Figure 2:
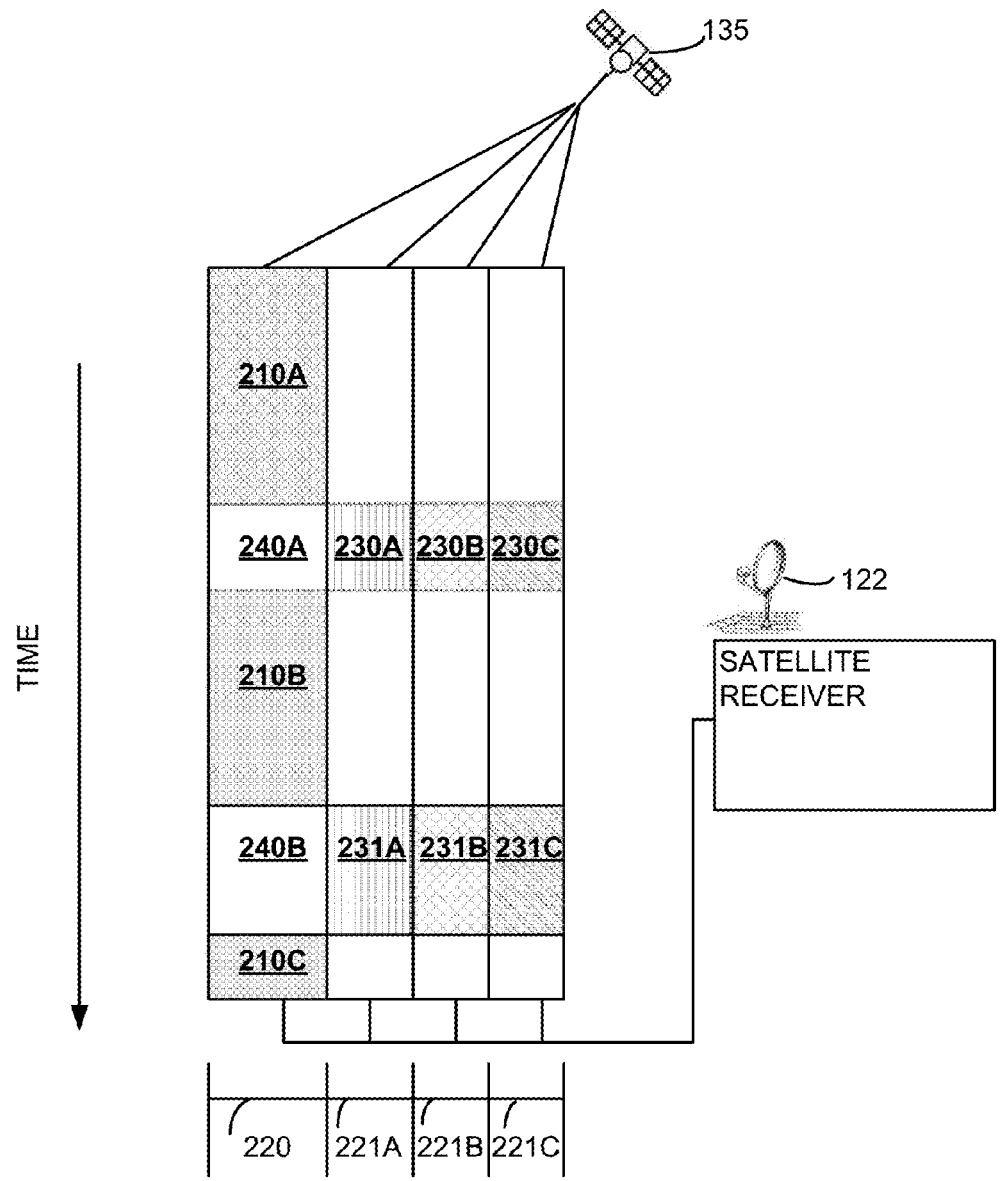
FIG. 2 is a block diagram depicting an exemplary broadcast of program content, broadcast concurrently with a plurality of targeted advertisements, in accordance with an embodiment of the disclosure.

Referring now to FIG. 2, a block diagram depicting an exemplary broadcast of program content 210, broadcast concurrently with a plurality of targeted advertisements 230, 231, in accordance with an embodiment of the disclosure. Satellite broadcaster 130 may broadcast multiple frequency channels 220, 221A, 221B, 221C concurrently, through satellite 135, to satellite receiver 122. Program content segments 210A, 210B, 210C may be broadcast on a program content frequency channel 220, while targeted advertisements 230A, 230B, 230C, 231A, 231B, 231C may be broadcast on advertisement frequency channels 221A, 221B, 221C, each targeted to a different viewing audience demographic. The program segments 210A, 210B, 210C may be separated by advertisement insertion points 240A, 240B, where the program content 210 owner has determined advertisements 230, 231 may be inserted. Satellite broadcaster 130 may broadcast a default advertisement in the program content frequency channel 220, during the advertisement insertion points 240, in the event that no targeted advertisements 230, 231 are available.

Figure 3:
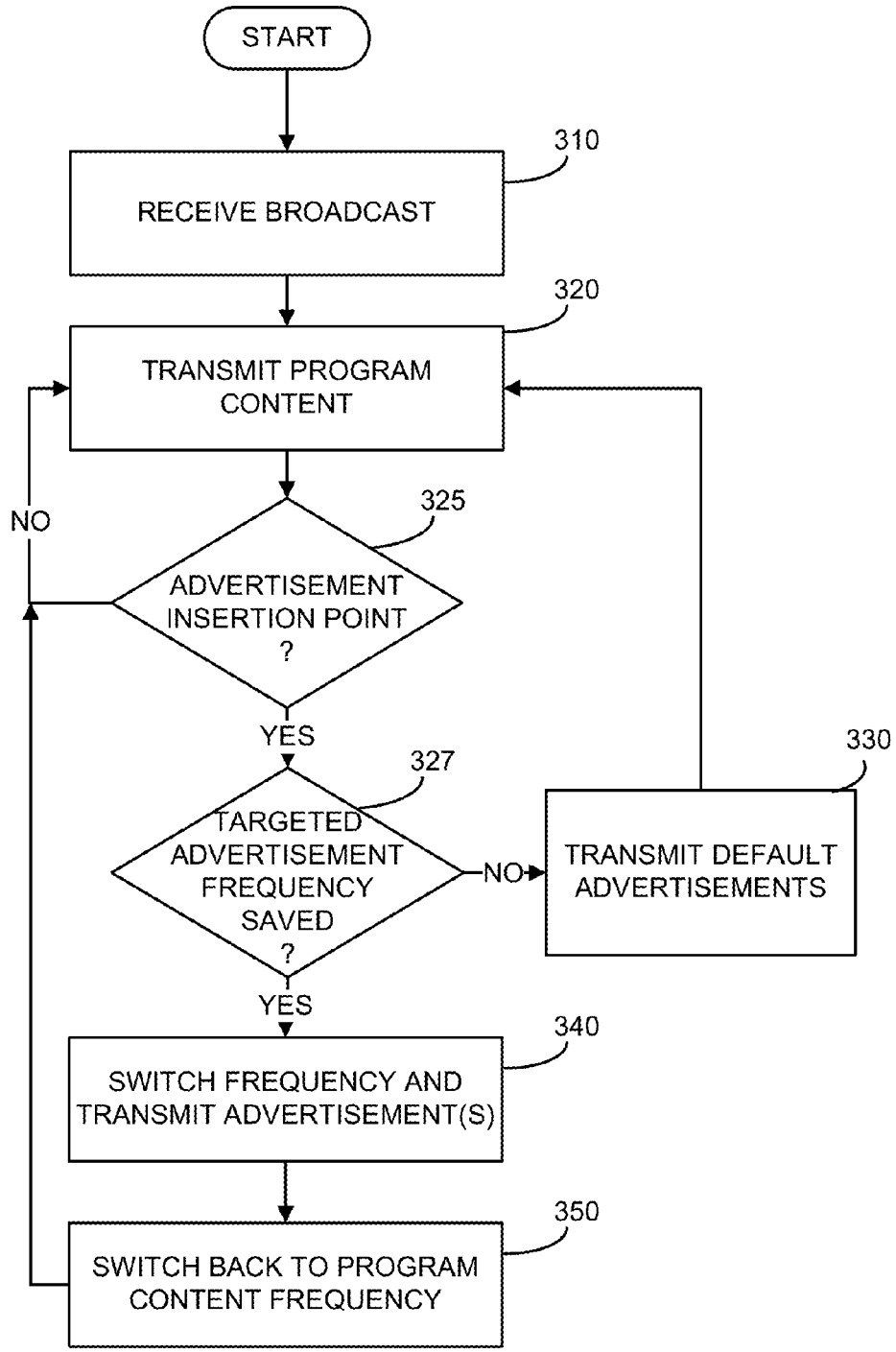
FIG. 3 is a flowchart illustrating the operation of a satellite receiver's selector, selecting targeted advertisements, in accordance with an embodiment of the disclosure.

FIG. 3 is a flowchart illustrating the operation of a satellite receiver's 122 selector 100, selecting targeted advertisements, in accordance with an embodiment of the disclosure.

In various embodiments of the disclosure, selector 100 may have previously received a signal from broadcaster 130 with an advertisement frequency channel 221A, 221B, 221C to monitor for targeted advertisements based on the viewing habits and demographics associated with the viewing audience of the satellite receiver 122. The signaled advertisement frequency channel 221A, 221B, 221C may be saved in the receiver profile 120. Satellite receiver selector 100 may receive a broadcast, at 310, from broadcaster 130 which includes program content 210 on a program content frequency channel 220 and a plurality of targeted advertisements 230, 231 on advertisement frequency channels 221. During the program content segments, 210A, 210B, 210C, selector 100 may, at 320, transmit the program content 210 to the televisions 140 connected to the satellite receiver 122 that are tuned in to that program channel. At 325, selector 100 recognizes whether or not an advertisement insertion point 240A, 240B in the program content 210 has been reached. If an advertisement insertion point 240A, 240B has not been reached, program content 210 may continue to be sent to the televisions 140. If an insertion point has been reached, as determined at 325, selector 100 may determine, at 327, whether a targeted advertisement frequency channel 221 has been saved in the receiver profile 120. In various embodiments, if no advertisement frequency channel has been saved in the receiver profile 120, as determined at 327, selector 100 may, at 330, transmit default advertisements to the televisions 140. In certain embodiments, satellite broadcaster 130 may broadcast default advertisements in the same frequency channel 220 as the program content 210. In other embodiments, a default targeted advertisement frequency channel 221A, 221B, 221C may be selected. A default targeted advertising frequency channel 221 may be pre-set in the receiver profile 120 by the broadcaster 130.

If an advertisement frequency channel 221A, 221B, 221C has been saved in the receiver profile 120, as determined at 327, selector 100 may switch, at 340, from the program content frequency channel 220 to the saved advertisement frequency channel 221A, 221B, 221C and transmit the targeted advertisements 230, 231 broadcast in the switched-to advertisement frequency channel 221A, 221B, 221C, to the televisions 140. In various embodiments, the selected targeted advertisements 230, 231 may be shown on all televisions 140 displaying advertisements, regardless of program channel selected on each television 140A, 140B.

At the end of the advertisement insertion point 240A, 240B, selector 100 may switch back, at 350, to the program content frequency channel 220 and continue transmitting program content 210 to the televisions 140.

Referring again to FIG. 1, in accordance with an embodiment of the disclosure, selector 100 may additionally receive multiple advertisements concurrently with the program content 210 for display on the televisions 140 connected to the satellite receiver 122 and tuned in to that program channel. In various embodiments, receiver profile 120 may include television 140A, 140B information, such as the television's 140A, 140B viewing area dimensions. In various embodiments, selector 100 may receive information about televisions 140 from the set-top boxes 150 associated with the televisions 140 and may save the information in the receiver profile 120.

The set-top box 150A, 150B may be configured for the television 140A, 140B manually, such as with a switch, through an application on the remote control 145A, 145B, or through direct communication with the television 140A, 140B. Selector 100 may transmit program content 210 with concurrent advertisements to television 140A, 140B through set-top box 150A, 150B.

In various embodiments, satellite receiver 122 includes a plurality of templates 110A, 110B, 110C, 110D that may define how program content 210 and concurrent advertisements are to be displayed, hereinafter "display layout", in the television 140A, 140B viewing area. In certain embodiments, selector 100 may receive the plurality of templates 110A, 110B, 110C, 110D from satellite broadcaster 130. In other embodiments, the templates 100 may be predefined in the satellite receiver 122. The plurality of templates 110 may define the display layouts for a plurality of television viewing area dimensions. The display layout may include the locations in the television 140A, 140B viewing area where program content may be displayed, locations where advertisements may be displayed, the size of the advertisements displayed, and the number of concurrent advertisements to be displayed along with the program content 210. The plurality of templates 110 may remain static for the life of a broadcast subscription, or may be updated when a subscription renews, or may be updated regularly as the satellite broadcaster's 130 advertising needs change.

Satellite receiver 122 represents a device, system or environment, and may be a roof-top receiver, a television set-top box, a laptop computer, a notebook computer, a personal computer (PC), a desktop computer, a tablet computer, a mobile phone or any other electronic device capable of performing the required functionality of embodiments of the disclosure. Satellite receiver 122 may include hardware components, as depicted and described in further detail with respect to FIG. 6. In other various embodiments of the present disclosure, satellite receiver 122 may represent a cluster of components acting as a single pool of seamless resources. In general, satellite receiver 122 is representative of any device or combination of devices capable of receiving a broadcast signal and executing in accordance with an embodiment of the disclosure.

Figure 4:
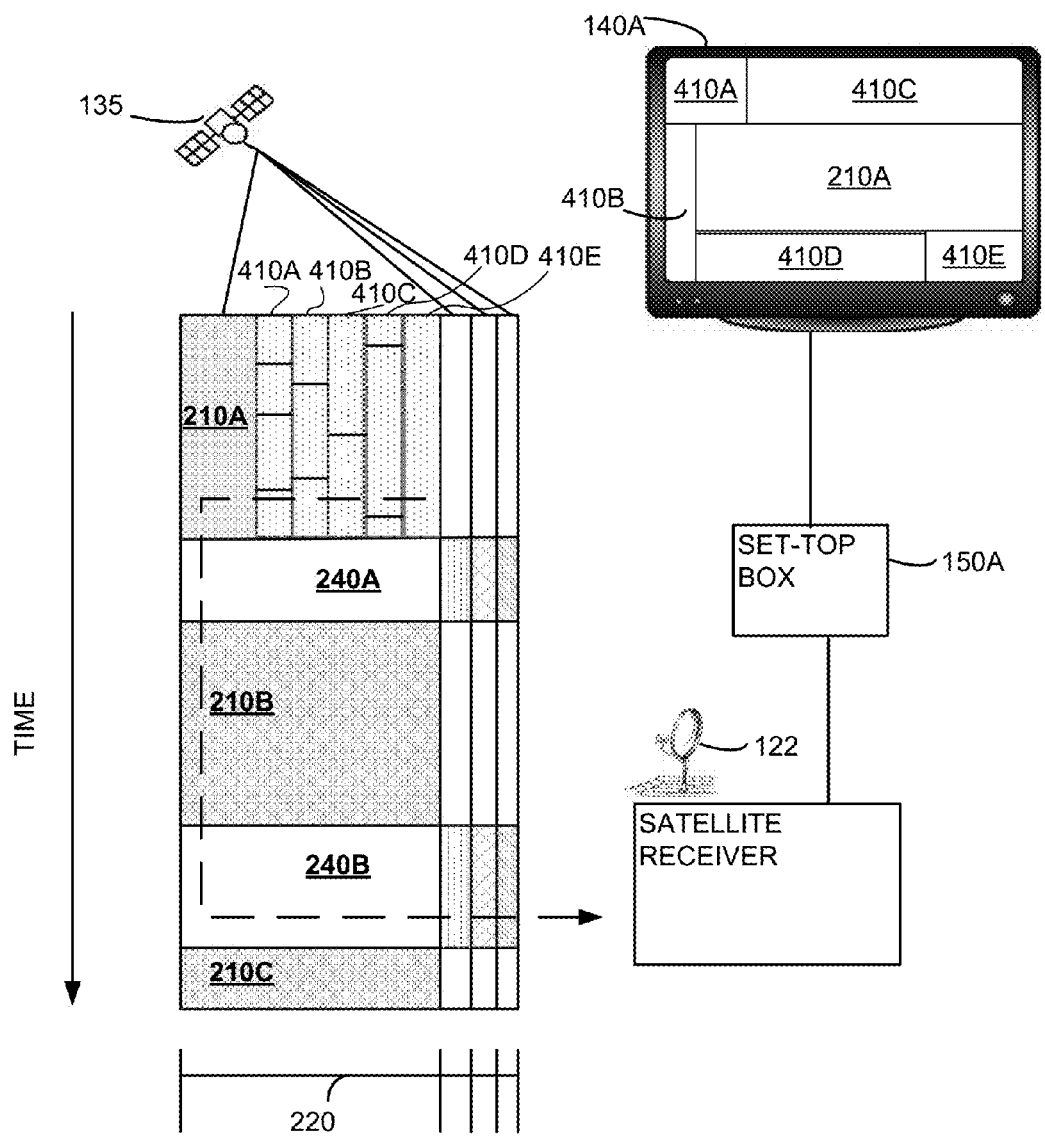
FIG. 4 is a block diagram depicting an exemplary broadcast of program content, customized viewing area advertisements and resulting display, in accordance with an embodiment of the disclosure.

Referring now to FIG. 4, a block diagram depicting an exemplary broadcast of program content 210, customized viewing area advertisements 410A, 410B, 410C, 410D, 410E, and resulting display, in accordance with an embodiment of the disclosure. In the exemplary embodiment, customized viewing area advertisements 410 and program content 210 may be broadcast as a multiplexed signal in the program content frequency channel 220. A multiplexed signal may subdivide the capacity of the broadcast program content frequency channel 220 allowing for multiple content, such as program content 210A and a plurality of customized viewing area advertisements 410.

Television 140A illustrates an exemplary display layout in its viewing area. Program content 210A and concurrent customized viewing area advertisements 410A, 410B, 410C, 410D, 410E are displayed. The viewing area of television 140A is divided into defined areas for the program content 210A, and the custom viewing area advertisements 410 based on a template 110A, 110B, 110C, 110D that corresponds to the television 140A viewing area dimensions. The plurality of customized viewing area advertisements 410 may co-exist with program content 210A in the television 140A, 140B viewing area without overlaying any program content 210A.

Figure 5:
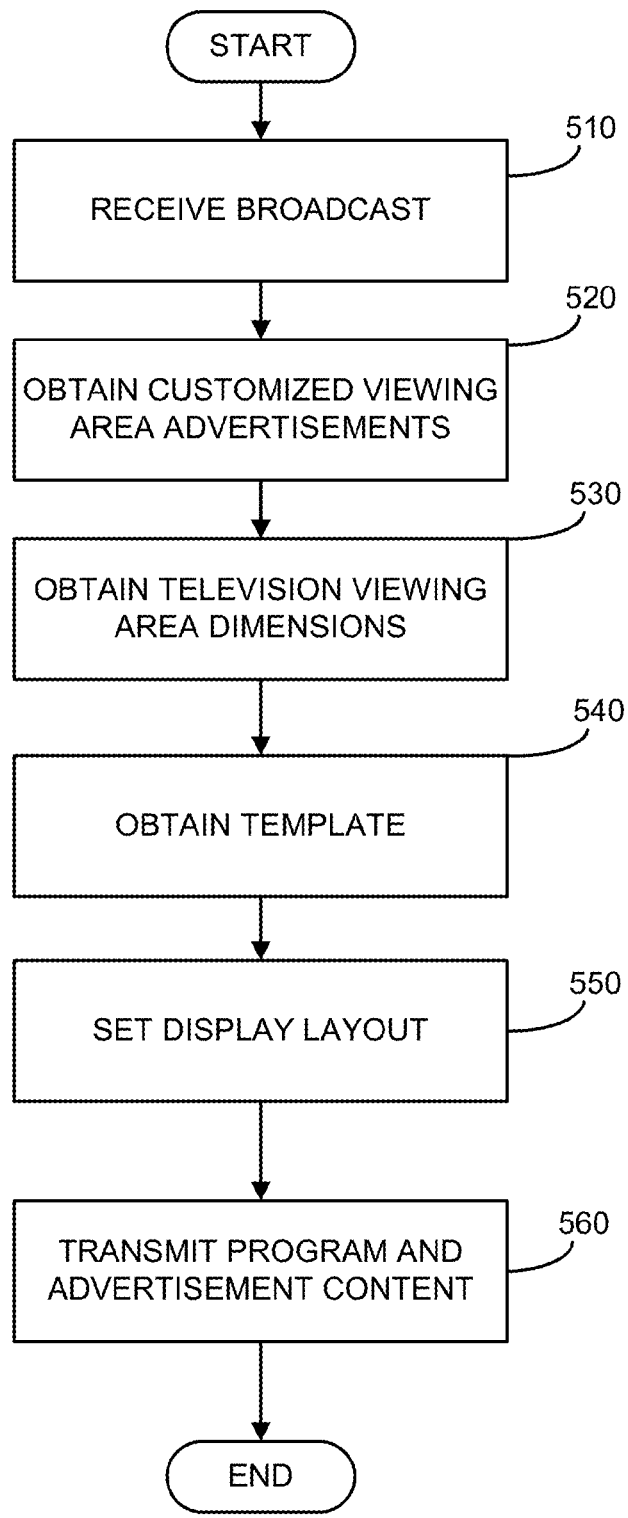
FIG. 5 is a flowchart illustrating the operation of a satellite receiver's selector, selecting templates and customized viewing area advertisements, in accordance with an embodiment of the disclosure.

FIG. 5 is a flowchart illustrating the operation of a satellite receiver's 122 selector 100, selecting templates 110 and customized viewing area advertisements 410, in accordance with an embodiment of the disclosure. In various embodiments of the disclosure, selector 100 may have previously received a plurality of templates 110 from broadcaster 130 with display layouts for a variety of television 140A, 140B viewing area dimensions. The templates 110 may, alternately, have been preset in the satellite receiver 122. Selector 100 may receive a multiplexed broadcast, at 510, from broadcaster 130, which includes concurrently broadcast program content 210 and a plurality of customized viewing area advertisements 410 on a program content frequency channel 220.

Selector 100 may de-multiplex, or split, the broadcast to obtain, at 520, the customized viewing area advertisements 410 to be displayed in the television 140A, 140B viewing area along with the program content 210. Selector 100 may, at 530, obtain the television 140A, 140B viewing area dimensions saved in the receiver profile 120 and, at 540, obtain the template 110A, 110B, 110C, 110D that corresponds to the obtained television 140A, 140B viewing area dimensions. Selector 100 may, at 550, set the display layout for the program content 210 and customized viewing area advertisements 410 for television 140A, 140B based on the obtained template 110A, 110B, 110C, 110D.

In certain embodiments, customized viewing area advertisements 410 may be prioritized. Templates 110 for small televisions 140 may include fewer locations for customized viewing area advertisements 410 than may be received in the broadcast program frequency channel 220. Selector 100 may utilize the priority to determine which customized viewing area advertisements 410 to display. Certain embodiments may prioritize customized viewing area advertisements 410 by their broadcast frequency. In other embodiments, customized viewing area advertisements 410 may include broadcast header information that indicates the priority of the customized viewing area advertisement 410A, 410B, 410C, 410D, 410E. Selector 100 may, at 560, transmit the program content 210 and customized viewing area advertisements 410, laid out for display based on the template 110A, 110B, 110C, 110D, to television 140A, 140B. In various embodiments, customized viewing advertisements 410 may be displayed concurrently with targeted advertisements 230, 231 displayed during advertisement insertion points 240 as well as concurrently with program content 210.

In certain embodiments all satellite receivers 122 in the satellite broadcast system 199 select the same customized viewing area advertisements 410 broadcast in a program content frequency channel 220.

In various other embodiments, customized viewing area advertisements 410 may be targeted to particular viewing audiences. In certain embodiments, satellite broadcaster 130 may signal selector 100 which of the multiplexed signal frequencies or advertisement frequencies 221 to utilize to select targeted customized viewing area advertisements 410, much like targeted advertisements 230 231 are selected for advertisement insertion points 240. In other embodiments, customized viewing area advertisements 410 may include broadcast header information that indicates a target demographic group for the customized viewing area advertisement 410A, 410B, 410C, 410D, 410E. Selector 100 may utilize the header information to determine if the customized viewing area advertisement 410A, 410B, 410C, 410D, 410E is to be selected for display. The frequencies to monitor or target demographic groups to select may be saved in the receiver profile 120. Again, the values may be pre-determined by the broadcaster 130 or modified with a broadcast signal to the satellite receiver 122.

In various embodiments, selector 100 may receive targeted customized viewing area advertisements 410 in advertisement frequency channels 221. In certain embodiments, selector 100 may switch between the program content frequency channel 220 and the advertisement frequency channels 221 to periodically obtain targeted customized viewing area advertisements 410. In other embodiments, satellite receiver 122 may have a plurality of selectors 100, monitoring a plurality of frequency channels 220, 221A, 221B, 221C, much like picture-in-picture support. The selectors 100 may set the display layout utilizing the program content 210 from the program content frequency channel 220 and the targeted customized viewing area advertisements 410 or targeted advertisements 230, 231 from the advertisement frequency channels 221 for concurrent display on television 140A, 140B viewing area.

FIG. 6 depicts a block diagram of components of a satellite receiver 122 of the satellite broadcast system 199 of FIG. 1, in accordance with an embodiment of the disclosure. It should be appreciated that FIG. 6 provides only an illustration of one implementation and does not imply any limitations with regard to the environments in which different embodiments may be implemented. Many modifications to the depicted environment may be made.

Satellite receiver 122 can include one or more tuners 610, one or more decoders 620, one or more processors 630, one or more selectors 100, and one or more satellite receiver readable storage medium (media) 650, all interconnected over a communications fabric 626. Communications fabric 626 can be implemented with any architecture designed for passing data and/or control information between processors (such as microprocessors, communications and network processors, etc.), satellite receiver memory, peripheral devices, and any other hardware components within a satellite receiver 122. Tuners 610 may be operable to receive the broadcast frequency channels 220, 221, templates 110, and signals for targeted advertisement frequency and priority to monitor. Decoders 620 decode the received broadcast and may be programmed to decrypt or decode the satellite broadcast in accordance with purchases and selections made by a user.

One or more operating systems 628, selectors 100, and receiver profiles 120, as well as customized viewer templates 110 and receiver profile data received from the decoded satellite broadcast are stored on one or more of the satellite receiver readable storage medium 650 for execution by one or more of the processors 630. Processors 630 may be operable to run executable code in connection with various functions associated with satellite receiver 122. In the illustrated embodiment, each of the satellite receiver readable storage medium 650 can be a magnetic disk storage device of an internal hard drive, CD-ROM, DVD, memory stick, magnetic tape, magnetic disk, optical disk, a semiconductor storage device such as RAM, ROM, EPROM, flash memory or any other satellite receiver readable storage medium that can store a satellite receiver program and digital information. The storage medium 650 may be located within satellite receiver 122 or separately from satellite receiver 122.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for selecting a content filler from a plurality of content fillers in a satellite broadcast, the method comprising:

receiving, by a receiver, a content in a first broadcast frequency channel, and a plurality of content fillers in a respective plurality of second broadcast frequency channels, wherein the content includes a gap in content to be filled by one of the plurality of content fillers, the gap in content defined by a start indicator and an end indicator, and wherein receiving the content further comprises receiving the content and a plurality of display fillers, wherein the content and the plurality of display fillers are received concurrently in the first broadcast frequency channel;

transmitting, by the receiver, the content to a display device;

selecting, by the receiver, a display layout from a plurality of display layouts based on a size of the display device, wherein the display layout defines a location on a viewing area of the display device where content is to be displayed and one or more display fillers;

selecting, by the receiver, one or more of the plurality of display fillers based on a priority value assigned to at least one of the plurality of display fillers; and transmitting, by the receiver, the content and the one or more selected display fillers, in the selected display layout, to the display device.

2. The method according to claim 1, wherein determining, by the receiver, the second broadcast frequency channel, from among the plurality of second broadcast frequency channels utilizes a pre-determined frequency channel.

3. The method according to claim 1:
wherein receiving the content further comprises determining, by the receiver, a second broadcast frequency channel, from among the plurality of second broadcast frequency channels, wherein the second broadcast frequency channel is determined based on the viewing habits and demographic information of a user of the receiver;
responsive to receiving the start indicator:
switching, by the receiver, to the determined second broadcast frequency channel;
transmitting, by the receiver, the content filler in the determined second broadcast frequency channel to the display device; and
responsive to the receiver receiving the end indicator:
switching, by the receiver, to the first broadcast frequency channel; and
transmitting, by the receiver, the content to the display device.

4. The method according to claim 1, wherein the plurality of display fillers includes control information, the control information including:
a display filler priority, and
a display filler target group.

5. The method according to claim 4, wherein selecting, by the receiver, the one or more of the plurality of display fillers is based on the display filler priority.

6. The method according to claim 4, wherein selecting, by the receiver, the one or more of the plurality of display fillers is based on the display filler target group.

7. The method according to claim 1, wherein the plurality of display fillers are received, by the receiver, in a respective plurality of second broadcast frequency channels.

8. The method according to claim 7, wherein selecting, by the receiver, the one or more of the plurality of display fillers is based on the second broadcast frequency channel selected by the receiver from among the plurality of second broadcast frequency channels.

9. The method according to claim 8, wherein selecting, by the receiver, the second broadcast frequency channel, from among the plurality of second broadcast frequency channels utilizes a pre-determined frequency channel.

10. The method according to claim 1, wherein the characteristics of the display device include display device viewing area dimensions.

* * * * *